United States Patent
Cheon

(10) Patent No.: US 7,319,626 B2
(45) Date of Patent: Jan. 15, 2008

(54) HIGH VOLTAGE GENERATING CIRCUIT AND METHOD AND SEMICONDUCTOR MEMORY DEVICE INCLUDING THE CIRCUIT

(75) Inventor: Kwun-Soo Cheon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 26 days.

(21) Appl. No.: 11/328,891

(22) Filed: Jan. 10, 2006

(65) Prior Publication Data

US 2006/0176103 A1   Aug. 10, 2006

(30) Foreign Application Priority Data

Jan. 24, 2005   (KR) .................. 10-2005-0006402

(51) Int. Cl.
*G11C 7/00* (2006.01)

(52) U.S. Cl. .................. 365/203; 365/189.09; 327/536

(58) Field of Classification Search ................ 365/203, 365/189.09, 189.08; 327/535, 536, 537
See application file for complete search history.

(56) References Cited

U.S. PATENT DOCUMENTS

| | | | |
|---|---|---|---|
| 6,255,900 B1 * | 7/2001 | Chang et al. | ................ 327/589 |
| 6,356,501 B2 | 3/2002 | Park et al. | |
| 6,584,031 B2 * | 6/2003 | Fujisawa et al. | ............. 365/226 |
| 6,700,436 B2 | 3/2004 | Shim | |
| 2006/0120179 A1 * | 6/2006 | Hwang et al. | ......... 365/189.11 |
| 2006/0220729 A1 * | 10/2006 | Kim | ........................... 327/536 |

FOREIGN PATENT DOCUMENTS

| | | |
|---|---|---|
| DE | 102 49 604 A1 | 6/2003 |
| JP | 2000-232773 | 8/2000 |
| KR | 1020030082239 A | 10/2003 |

* cited by examiner

*Primary Examiner*—Anh Phung
*Assistant Examiner*—Hien N Nguyen
(74) *Attorney, Agent, or Firm*—Myers Bigel Sibley & Sajovec PA

(57) ABSTRACT

A first pump circuit is coupled to a first pump signal line and is configured to generate a first voltage greater than a power supply voltage at an output thereof responsive to transition of the first pump signal line from a ground voltage to the power supply voltage. A second pump circuit includes a first switching circuit configured to couple a first capacitor between the output of the first pump circuit and a ground voltage node responsive to the transition of a first pump signal line from the ground voltage to the power supply voltage to charge the first capacitor to the first voltage, and to couple a second capacitor between the first capacitor and a second pump signal line responsive to a transition of the second pump signal line from the ground voltage to the power supply voltage to generate a second voltage greater than the first voltage.

22 Claims, 8 Drawing Sheets

HIGH VOLTAGE GENERATING CIRCUIT AND METHOD AND SEMICONDUCTOR MEMORY DEVICE INCLUDING THE CIRCUIT

CROSS-REFERENCE TO RELATED APPLICATION

This application claims the benefit of Korean Patent Application No. 2005-6402, filed Jan. 24, 2005, the disclosure of which is hereby incorporated herein by reference in its entirety.

BACKGROUND OF THE INVENTION

The present invention relates to voltage generating circuits and methods, and more particularly, to circuits and methods for generating a voltage greater than a power supply voltage of a semiconductor memory device.

A conventional semiconductor memory device typically includes a plurality of memory cells, with each cell including a capacitor and an NMOS transistor. A gate of the NMOS transistor typically is connected to a word line. When a power supply voltage is applied to the gate of the NMOS transistor, the NMOS transistor is turned on, so that a ground voltage is transmitted without a loss in threshold voltage, while a power supply voltage is transmitted with a loss in threshold voltage. To transmit a power supply voltage without a loss in threshold voltage, a voltage higher than the power supply voltage typically is applied to the gate. In general, the high voltage is set to be greater than a threshold voltage of the NMOS transistor, added to a power supply voltage. The semiconductor memory device typically includes a high voltage generating circuit for generating the high voltage.

FIG. 1 is a diagram showing a conventional high voltage generating circuit. The high voltage generating circuit includes a high-voltage level detector 10, a control signal generator 12, and a high voltage generator 14. The high voltage generator 14 is composed of capacitors C1-C4 and switches SW1-SW8. Operations of the respective components shown in FIG. 1 will now be described.

The high-voltage level detector 10 detects a high voltage VPP and generates a high-voltage level detection signal VPPEN when the high voltage VPP is lower than a target level. The control signal generator 12 drives the precharge signal P1 and pump signals P2-P4 in response to the high-voltage level detection signal VPPEN. The switches SW1, SW2, SW3, and SW6 precharge each of nodes n1, n2, n3, and n4 to a voltage VDD in response to the precharge signal P1. The capacitors C1 and C2 pump the nodes n1 and n2, respectively, in response to the pump signal P2. The capacitor C3 pumps the node n3 in response to the pump signal P3, and the capacitor C4 pumps the node 4 in response to the pump signal P4. The switch SW4 is turned on in response to the pump signal P2 and allows charge to be shared between the nodes n2 and n3, and the switch SW5 is turned on in response to the pump signal P2 and allows charge to be shared between the nodes n1 and n4. The switch SW7 is turned on in response to the pump signal P3 and allows charge to be shared between the nodes n3 and n4. The switch SW8 is turned on in response to the pump signal P4 and allows charge to be shared between the node n4 and a high voltage generating terminal n5.

FIG. 2 is a timing diagram illustrating operations of the high voltage generating circuit shown in FIG. 1. When the control signal generator 12 drives the precharge signal P1 to a high level for a precharge period T1, the switches SW1, SW2, SW3, and SW6 are turned on so that the nodes n1 to n4 are precharged to a power supply voltage VDD.

When the control signal generator 12 drives the pump signal P2 to a high level during a first pumping period T2, the capacitors C1 and C2 pump the nodes n1 and n2 to a voltage 2 VDD. The switch SW4 and SW5 are turned on in response to the high level of the pump signal P2, so that charge is shared between the nodes n1 and n4 and between the nodes n2 and n3, respectively. Thus, the nodes n1-n4 reach a voltage 1.5 VDD.

When the control signal generator 12 drives the pump signal P3 to a high level during a second pumping period T3, the capacitor C3 pumps the node n3 to a voltage 2.5 VDD. The switch SW7 is turned on in response to the high level of the pump signal P3, so that charge is shared between the nodes n3 and n4. Thus, the nodes n3 and n4 reach a voltage 2 VDD.

When the control signal generator 12 drives the pump signal P4 to a high level during a third pumping period T4, the capacitor C4 pumps the node n4 to a voltage 3 VDD. The switch SW8 is turned on in response to the high level of the pump signal P4, so that charge is shared between the node n4 and the high voltage generating terminal n5. Thus, the node n4 and the high voltage generating terminal n5 are pumped to a voltage α. In this manner, the high voltage generating terminal n5 can reach a maximum voltage 3 VDD. The high voltage generating circuit shown in FIG. 1 includes four pumping capacitors C1-C4 and performs a three-stage pumping operation to produce a maximum voltage 3 VDD.

FIG. 3 is a diagram showing another conventional high voltage generating circuit. The high voltage generating circuit includes a high-voltage level detector 20, a control signal generator 22, and a high voltage generator 24. The high voltage generator 24 includes capacitors C5 and C6 and switches SW10-SW15. Functions of the respective components shown in FIG. 3 will now be described.

The high-voltage level detector 20 detects a high voltage VPP and generates a high-voltage level detection signal VPPEN when the high voltage VPP is lower than a target level. The control signal generator 22 drives the precharge signal P1 and a pump signal P2 in response to the high-voltage level detection signal. The switches SW10, SW11, SW13, and SW14 precharge nodes n5 and n7 to a ground voltage in response to the precharge signal P1 and precharge nodes n6 and n8 to a power supply voltage VDD. The switch SW12 connects the nodes n6 and n7 in response to the pump signal P2, and the switch SW15 connects the node n8 and a high voltage generating terminal n9 in response to the pump signal P2.

FIG. 4 is a timing diagram illustrating operations of the high voltage generating circuit shown in FIG. 3. When the control signal generator 22 drives the precharge signal P1 to a high level during a precharge period T1, all the switches SW10, SW11, SW13, and SW14 are turned on so that the nodes n5 and n7 are precharged to a ground voltage and the nodes n6 and n8 are precharged to a power supply voltage VDD. When the control signal generator 22 drives the pump signal P2 to a high level during a pumping period T2, the node n5 reaches a power supply voltage VDD, and the capacitor C5 pumps the node n6 to a voltage 2 VDD. Because the switch SW12 is turned on, the node n7 reaches a voltage 2 VDD like the node n6, and the capacitor C6 pumps the node n8 to a voltage 3 VDD. Because the switch SW15 is turned on, charge is shared between the node n8 and a high voltage generating terminal n9, so that the node n8 and the high voltage generating terminal n9 are pumped to a voltage α. In this manner, the high voltage generating terminal n9 may reach a maximum voltage 3 VDD. That is, the high voltage generating circuit shown in FIG. 3 includes two pumping capacitors C5 and C6 and performs a single pumping operation to produce a maximum voltage 3 VDD. Accordingly, the high voltage generating circuit shown in FIG. 3 includes fewer pumping capacitors than the high voltage generating circuit shown in FIG. 1 and may generate a target high voltage with a single pumping operation.

However, semiconductor memory devices generally are being designed with increasingly lower power supply voltage and faster operation as semiconductor manufacturing technologies progress. If a target level for a high voltage decreases, a conventional high voltage generating circuit may be used to generate the target high voltage. However, as power supply voltage decreases, decreases in high voltage may be limited, because the threshold voltage of an NMOS transistor generally cannot be decreased below a certain value. Also, because the period of a high-voltage level detection signal is shortened due to high-speed operation, it is desirable to reduce the number of pumping operations needed to generate a high voltage. Therefore, it is desirable to provide a high voltage generating circuit having excellent pumping capability without an undue number of pumping operations.

SUMMARY OF THE INVENTION

In some embodiments of the present invention, a high voltage generating circuit includes a high-voltage level detector for detecting a level of high voltage to generate a high-voltage level detection signal. The high voltage generating circuit also includes a control signal generator for generating a precharge control signal and first and second pumping control signals in response to the high-voltage level detection signal. The high voltage generating circuit further includes a high voltage generator including a first pumper and a second pumper, the first pumper including first and second capacitors, pumping a first output node by serially connecting the first and second capacitors in response to the first pumping control signal, and allowing charges to be shared between the first output node and a second output node, the second pumper including third and fourth capacitors, pumping the second output node by serially connecting the third and fourth capacitors in response to the second pumping control signal, and allowing charges to be shared between the second output node and a high voltage generating terminal, the high voltage generator for connecting the first, second, third, and fourth capacitors between a first precharge voltage level and a second precharge voltage level in response to the precharge control signal.

In some embodiments, the first pumper comprises a first precharge circuit for precharging a first node to the first precharge voltage level in response to the precharge control signal, a second precharge circuit for precharging a second node to the second precharge voltage level in response to the precharge control signal, a third precharge circuit for precharging the first output node to the first precharge voltage level in response to the precharge control signal, a first switch for connecting the first and second nodes in response to the first pumping control signal, and a second switch for allowing charges to be shared between the first and second output nodes in response to the first pumping control signal, wherein the first capacitor is connected between the first pumping control signal and the first node, and the second capacitor is connected between the second node and the first output node. The first precharge voltage level is a power supply voltage level, and the second precharge voltage level is a ground voltage level. The second pumper comprises a fourth precharge circuit for precharging a third node to the first precharge voltage level in response to the precharge control signal, a fifth precharge circuit for precharging a fourth node to the second precharge voltage level in response to a phase-inverted signal of the second pumping control signal, a sixth precharge circuit for precharging the second output node to the first precharge voltage level in response to the precharge control signal, a third switch for connecting the third to and the fourth node in response to the second pumping control signal, and a fourth switch for allowing charges to be shared between the second output node and the high voltage generating terminal in response to the second pumping control signal, wherein the third capacitor is connected between the second pumping control signal and the third node, and the fourth capacitor is connected between the fourth node and the second output node. The first precharge voltage level is a power supply voltage level, and the second precharge voltage level is a ground voltage level.

In additional embodiments of the present invention, a high voltage generating circuit includes a high-voltage level detector for detecting a level of high voltage to generate a high-voltage level detection signal. The high voltage generating circuit also includes a control signal generator for generating a precharge control signal and first and second pumping control signals in response to the high-voltage level detection signal. The high voltage generating circuit further includes a high voltage generator including a first pumper and a second pumper, the first pumper including a first capacitor, pumping a first output node in response to the first pumping control signal, and allowing charges to be shared between the first output node and a second output node, the second pumper including second and third capacitors, pumping the second output node by serially connecting the second and third capacitors in response to the second pumping control signal, and allowing charges to be shared between the second output node and a high voltage generating terminal, the high voltage generator for connecting the first, second, and third capacitors between a first precharge voltage level and a second precharge voltage level in response to the precharge control signal.

In some embodiments, the first pumper comprises a first precharge circuit for precharging the first output node to the first precharge voltage level in response to the precharge control signal, and a first switch for allowing charges to be shared between the first and second output nodes in response to the first pumping control signal, wherein the first capacitor is connected between the first pumping control signal and the first output node. The first precharge voltage level is a power supply voltage level, and the second precharge voltage level is a ground voltage level. The second pumper comprises a second precharge circuit for precharging a first node to the first precharge voltage level in response to the precharge control signal, a third precharge circuit for precharging a second node to the second precharge voltage level in response to a phase-inverted signal of the second pumping control signal, a fourth precharge circuit for precharging the second output node to the first precharge voltage level in response to the precharge control signal, a second switch for connecting the first and second nodes in response to the second pumping control signal, and a third switch for allowing charges to be shared between the second output node and the high voltage generating terminal in response to the second pumping control signal, wherein the second capacitor is connected between the second pumping control signal and the first node, and the third capacitor is connected between the second node and the second output node. The first precharge voltage level is a power supply voltage level, and the second precharge voltage level is a ground voltage level.

In some method embodiments, a method for generating a high voltage includes generating a high-voltage level detection signal by detecting a high voltage level, generating a precharge control signal and first and second pumping control signals in response to the high-voltage level detection signal, precharging a first node, a third node, a first output node, and a second output node to a first precharge voltage level and precharging a second node and a fourth node to a second precharge voltage level in response to the precharge control signal, pumping the first node by a first capacitor in response to the first pumping control signal, connecting the first and second nodes, pumping the first output node by a second capacitor in response to a level of the second node, and sharing charges between the first and second output nodes, and pumping the third node by a third capacitor in response to the second pumping control signal, connecting the third node and the fourth node, pumping the second output node by a fourth capacitor in response to a level of the fourth node, and sharing charges between the second output node and a high voltage generating terminal.

In further embodiments, a high voltage generating method includes detecting a high voltage level to generate a high-voltage level detection signal, generating a precharge control signal and first and second pumping control signals in response to the high-voltage level detection signal, precharging first and second output nodes and a first node to a first precharge voltage level and precharging a second node to a second precharge voltage level in response to the precharge control signal, pumping the first output node by a first capacitor in response to the first pumping control signal and sharing charges between the first and second output nodes, and pumping the first node by a second capacitor in response to the second pumping control signal, connecting the first and second nodes, pumping the second output node by a third capacitor in response to a level of the second node, and sharing charges between the second output node and a high voltage generating terminal.

In further embodiments, a semiconductor memory device includes: a high voltage generating circuit, which includes a high-voltage level detector for detecting a high voltage level to generate a high-voltage level detection signal, a control signal generator for generating a precharge control signal and first and second pumping control signals in response to the high-voltage level detection signal, and a high voltage generator including a first pumper and a second pumper, the first pumper including first and second capacitors, pumping a first output node by serially connecting the first and second capacitors in response to the first pumping control signal, and allowing charges to be shared between the first output node and a second output node, the second pumper including third and fourth capacitors, pumping the second output node by serially connecting the third and fourth capacitors in response to the second pumping control signal, and allowing charges to be shared between the second output node and a high voltage generating terminal, the high voltage generator for connecting the first, second, third, and fourth capacitors between a first precharge voltage level and a second precharge voltage level in response to the precharge control signal.

In still further embodiments, a semiconductor memory device includes: a high voltage generating circuit, which includes a high-voltage level detector for detecting a high voltage level to generate a high-voltage level detection signal, a control signal generator for generating a precharge control signal and first and second pumping control signals in response to the high-voltage level detection signal, and a high voltage generator including a first pumper and a second pumper, the first pumper including a first capacitor, pumping a first output node in response to the first pumping control signal, and allowing charges to be shared between the first output node and a second output node, the second pumper including second and third capacitors, pumping the second output node by serially connecting the second and third capacitors in response to the second pumping control signal, and allowing charges to be shared between the second output node and a high voltage generating terminal, the high voltage generator for connecting the first, second, and third capacitors between a first precharge voltage level and a second precharge voltage level in response to the precharge control signal.

DETAILED DESCRIPTION

Figure 1:
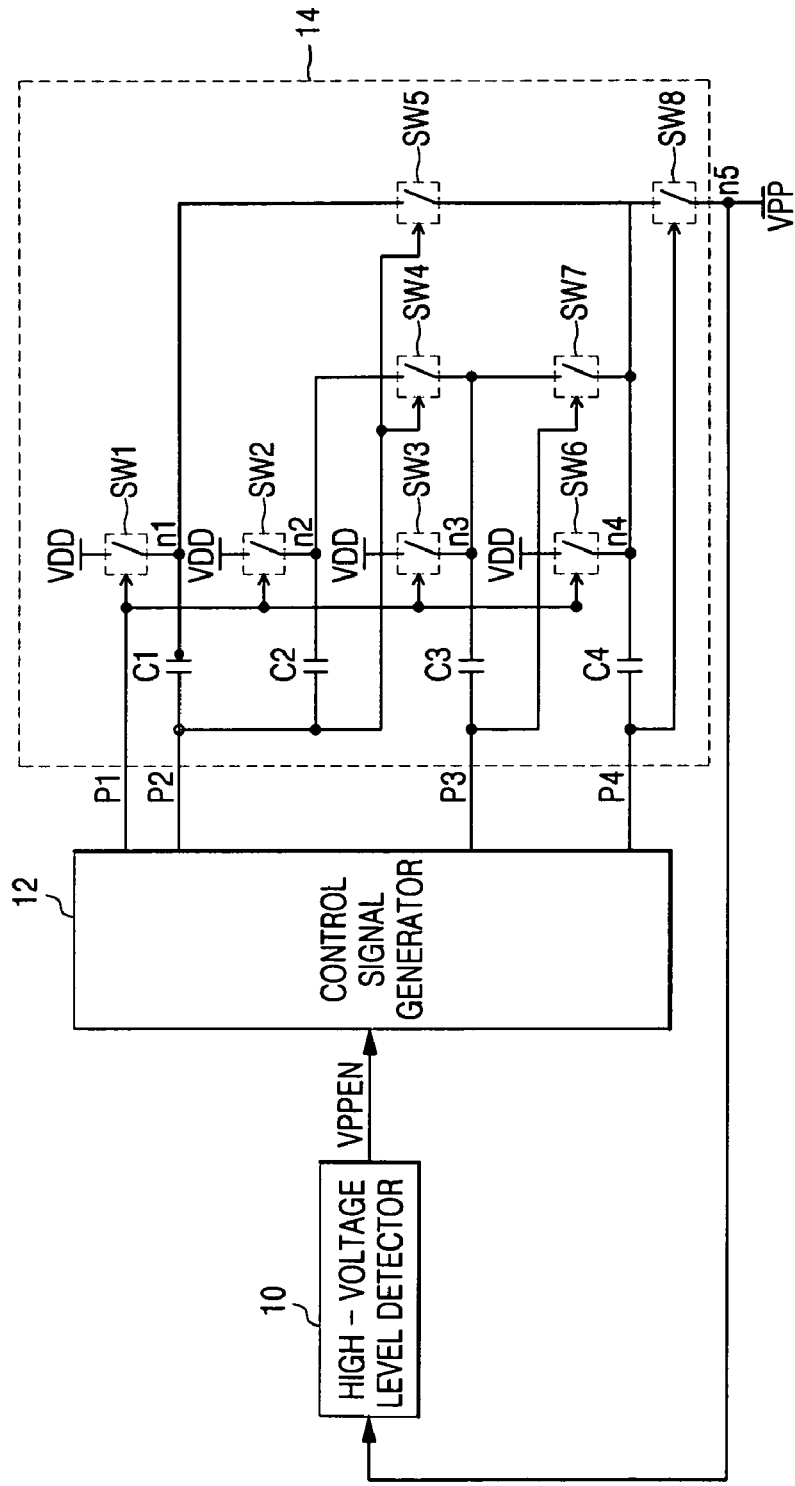
FIG. 1 is a diagram showing a conventional high voltage generating circuit.
Figure 2:
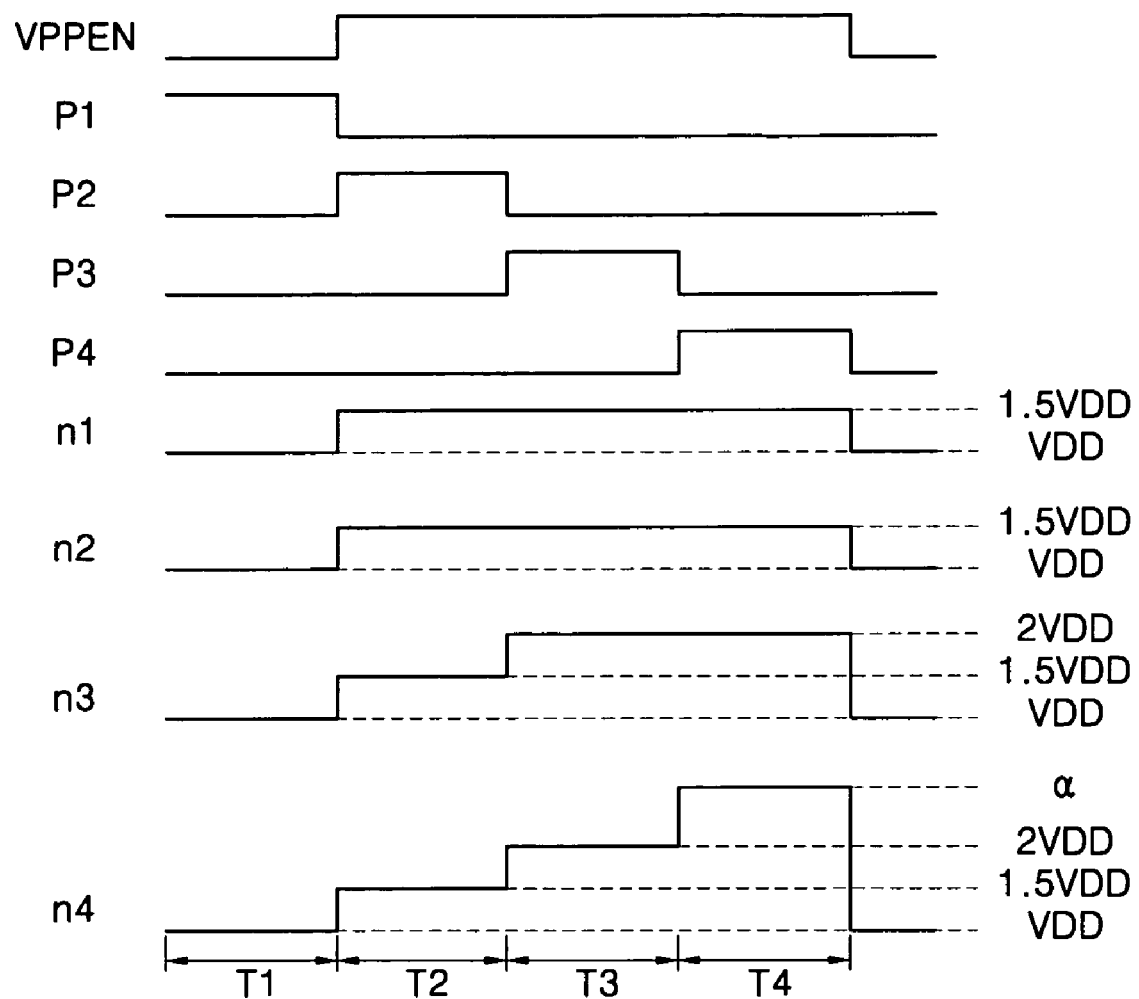
FIG. 2 is a timing diagram illustrating operations of the high voltage generating circuit shown in FIG. 1.
Figure 3:
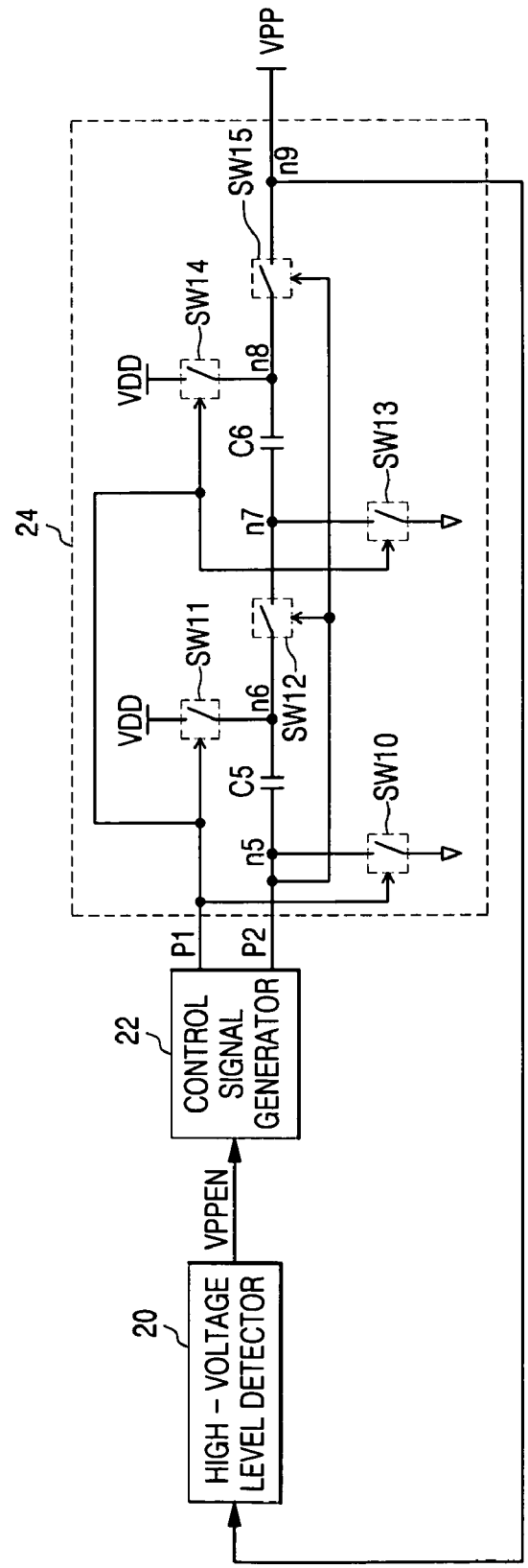
FIG. 3 is a diagram showing another conventional high voltage generating circuit.
Figure 4:
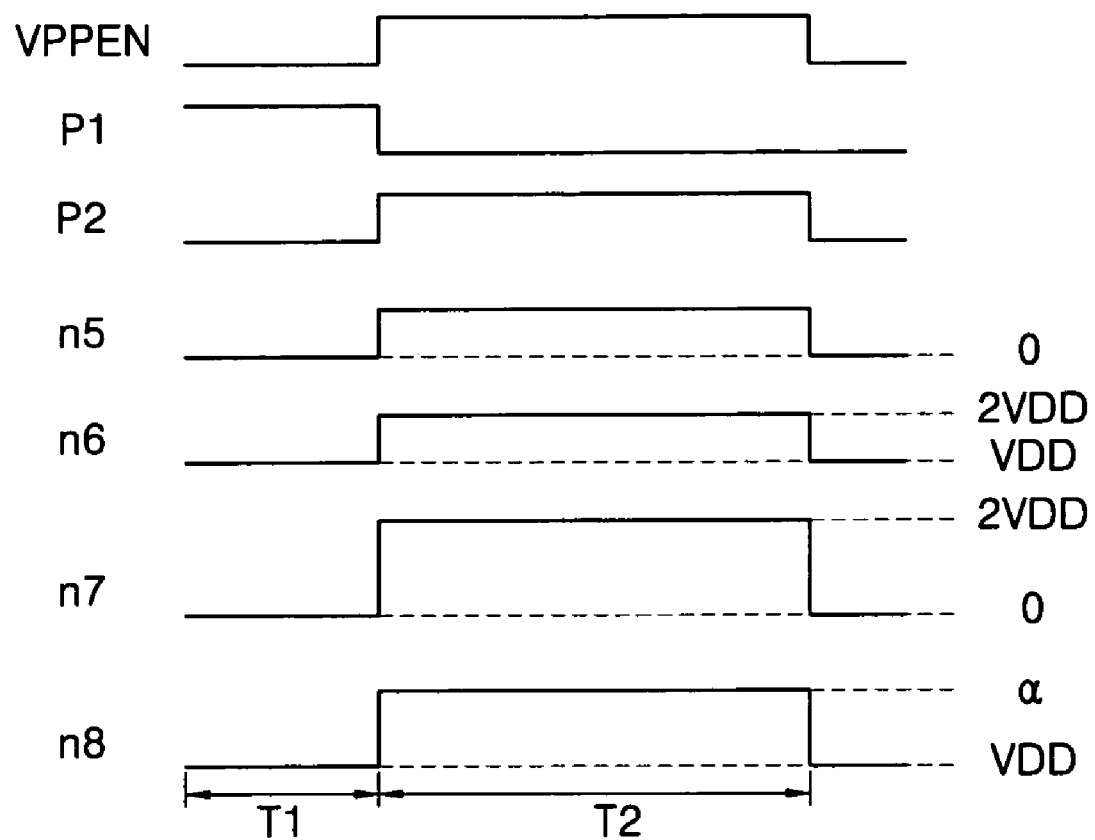
FIG. 4 is a timing diagram illustrating operations of the high voltage generating circuit shown in FIG. 3.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes or configurations of elements may be idealized or exaggerated for clarity.

It will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components and/or sections, these elements, components and/or sections should not be limited by these terms. These terms are only used to distinguish one element, component, or section from another element, region or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described herein, operations according to some embodiments of the present invention involve driving or transitioning signal lines, e.g., "pump signal lines", to a predetermined voltage, e.g., a power supply voltage or a ground voltage. As used herein, driving a signal line "to" a particular voltage includes driving the signal line "toward" the voltage in question. For example, driving a signal line "to a power supply voltage" includes driving the line to the point at which it actually achieves that voltage and/or driving the signal line substantially toward such voltage. Thus, for example, a driving operation that drives a signal line through a device, such as a transistor, such that it approaches the power supply voltage, but does not fully reach the power supply voltage because of a threshold voltage or diode drop associated with the transistor, nonetheless falls within the scope of driving the line "to" the power supply voltage.

Figure 5:
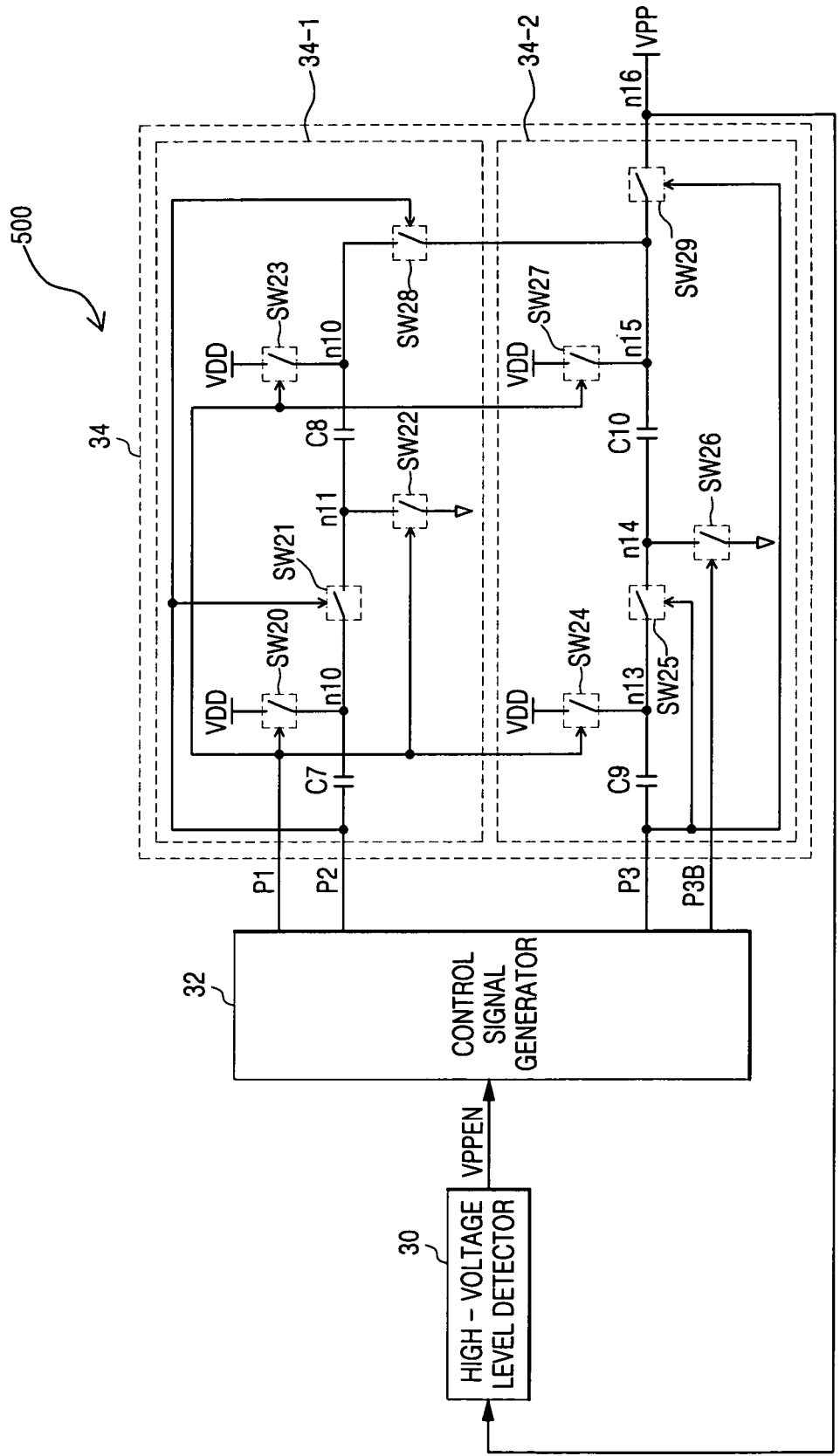
FIG. 5 is a diagram showing a high voltage generating circuit according to some embodiments of the present invention.

FIG. 5 is a diagram showing a high voltage generating circuit 500 according to some embodiments of the present invention. The high voltage generating circuit 500 includes a high-voltage level detector 30, a control signal generator 32, and a high voltage generator 34. The high voltage generator 34 includes a first pump circuit 34-1 and a second pump circuit 34-2. The first pump circuit 34-1 includes capacitors C7 and C8 and switches SW20-SW23 and SW28. The second pump circuit 34-2 includes capacitors C9 and C10 and switches SW24-SW27 and SW29. Functions of the circuit 500 shown in FIG. 5 will now be described.

The high-voltage level detector 30 detects a high voltage VPP and generates a high-voltage level detection signal VPPEN when the high voltage VPP is lower than a target level. The control signal generator 32 generates the precharge signal P1 and pump signals P2 and P3 in response to the high-voltage level detection signal VPPEN. The switches SW20, SW23, SW24, and SW27 precharge nodes n10, n12, n13, and n15 to a power supply voltage VDD in response to the precharge signal P1. The switch SW22 precharges node n11 to a ground voltage in response to the precharge signal P1. The switch SW21 connects the nodes n10 and n11 in response to the pump signal P2, and the switch SW22 connects the nodes n12 and n15 in response to the pump signal P2. The switch SW25 connects the node n13 and a node 14 in response to the pump signal P3, and the switch SW29 connects the node n15 and a high voltage generating terminal n16 in response to the pump signal P3. The switch SW26 precharges the node n14 to a ground voltage in response to an inverted pump signal P3B. The capacitors C7 and C8 perform pumping operations in response to the pump signal P2, and the capacitors C9 and C10 perform pumping operations in response to the pump signal P3.

Figure 6:
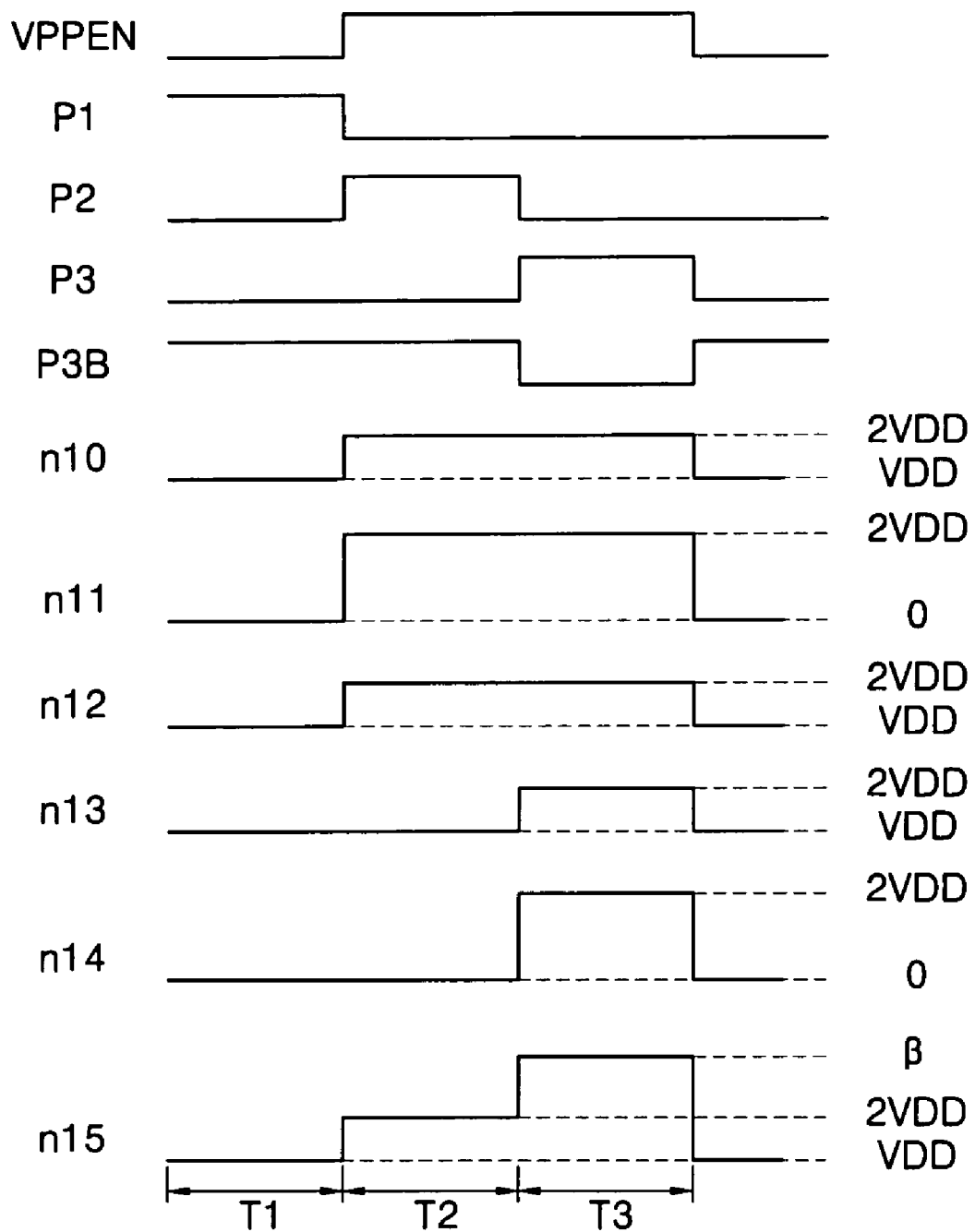
FIG. 6 is a timing diagram illustrating operations of the high voltage generating circuit shown in FIG. 5.

FIG. 6 is a timing diagram illustrating operations of the high voltage generating circuit 500 shown in FIG. 5. When the control signal generator 32 drives the precharge signal P1 to a high level during a precharge period T1, the switches SW20, SW22, SW23, SW24, and SW27 are turned on so that the nodes n10, n12, n13, and n15 are precharged to a power supply voltage VDD, and the switch SW22 is turned on so that the node n11 is precharged to a ground voltage. The inverted pump signal P3B is at a high level, such that the switch SW26 is turned on so that the node n14 is precharged to the ground voltage.

When the control signal generator 32 drives the pump signal P2 to a high level during a first pumping period T2, the switch SW2 is turned on, so that the nodes n10 and n11 are connected to each other and the capacitor C7 pumps the nodes n10 and n11 to a voltage 2 VDD. Once the node n11 reaches the voltage 2 VDD, the capacitor C8 pumps the node n12 to a voltage 3 VDD. The switch SW28 is turned on in response to the high level of the pump signal P2, so that charge is shared between the nodes n12 and n15. Thus, each of the nodes n12 and n15 reaches a voltage 2 VDD. Because the inverted pump signal P3B is at a high level, the switch SW26 is turned on so that the node n14 is maintained at the ground voltage.

The circuit may be designed such that the capacitances of the capacitors C7 and C8 are equal to the capacitance of the capacitor C10. In other words, if the capacitance of each of the capacitors C7 and C8 is C, because the total capacitance of the serially connected capacitors C7 and C8 is C/2, the capacitance of the capacitor C10 may be C/2. Also, because the capacitance of the capacitor C9 may be equal to the capacitance of the capacitor C10 that is serially connected to the capacitor C9, the capacitance of the capacitor C9 may be C/2.

When the control signal generator 32 drives a pump signal P3 to a high level during a second pumping period T3, the switches SW25 and SW29 are turned on and the switch SW26 is turned off, so that the node n13 is connected to the node 14 and the node n15 is connected to the high voltage generating terminal. The capacitor C9 pumps the nodes n13 and n14 to a voltage 2 VDD in response to the high level of the pump signal P3 to a high level. Once the node n14 reaches the voltage 2 VDD, the capacitor C10 pumps the node n15 to a voltage 4 VDD. Because the switch SW29 remains turned on, charge is shared between the node n15 and the high voltage generating terminal n16, so that the node n15 and the high voltage generating terminal n16 reach a voltage β. In this manner, the high voltage generating circuit 500 may generate a high voltage VPP to a voltage 4 VDD.

The high voltage generating circuit shown in FIG. 5 performs a two-stage pumping operation so that a maximum voltage 4 VDD may be obtained. Accordingly, even if the period of the high-voltage level detection signal VPPEN is shortened, the high voltage VPP may be maintained, and even if a power supply voltage is lowered, a highest pumping voltage may be elevated, thus a target high voltage VPP may be generated.

Figure 7:
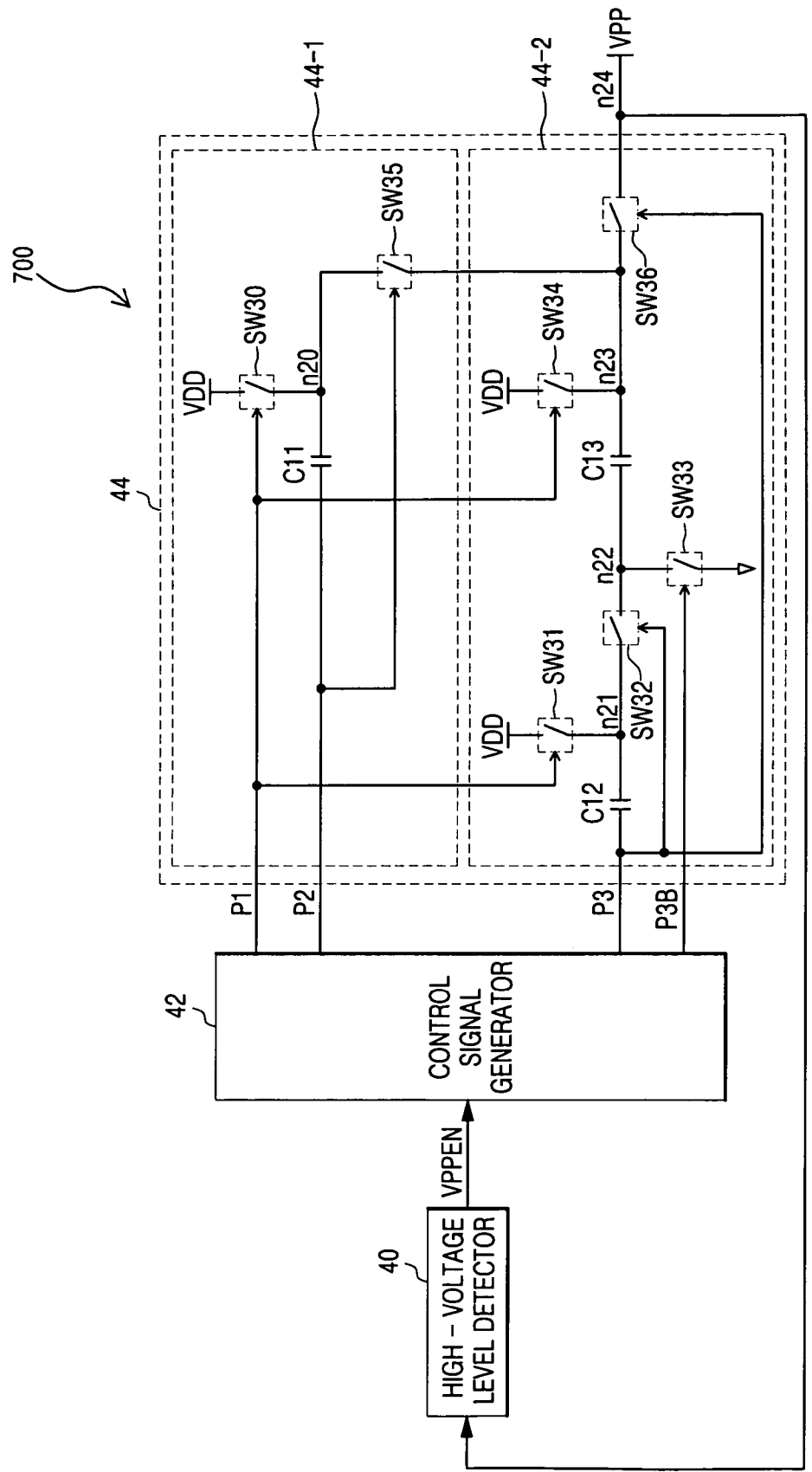
FIG. 7 is a diagram showing a high voltage generating circuit according to further embodiments of the present invention.

FIG. 7 is a diagram showing a high voltage generating circuit 700 according to further embodiments of the present invention. The high voltage generating circuit 700 includes a high-voltage level detector 40, a control signal generator 42, and a high voltage generator 44. The high voltage generator 44 includes a first pump circuit 44-1 and a second pump circuit 44-2. The first pump circuit 44-1 includes a capacitor C11 and switches SW30 and SW35, and the second pump circuit 44-2 includes capacitors C12 and C13 and switches SW31-SW34 and SW36. Operations of the circuit 700 shown in FIG. 7 will now be described.

The high-voltage level detector 40 detects a high voltage VPP and generates a high-voltage level detection signal VPPEN when the high voltage VPP is lower than a target level. The control signal generator 42 generates the precharge signal P1 and pump signals P2 and P3 in response to the high-voltage level detection signal VPPEN. The switches SW30, SW31, and SW34 precharge nodes n20, n21, and n23 to a power supply voltage VDD in response to the pump signal P1. The switch SW35 allows charge to be shared between the nodes n20 and n23 in response to the pump signal P2. The switch SW32 connects the node n21 and a node n22 in response to the pump signal P3, and the switch SW36 allows charge to be shared between the node n23 and a high voltage generating terminal n24 in response to the pump signal P3. The switch SW33 precharges the node n22 to a ground voltage in response to an inverted pump signal P3B.

Figure 8:
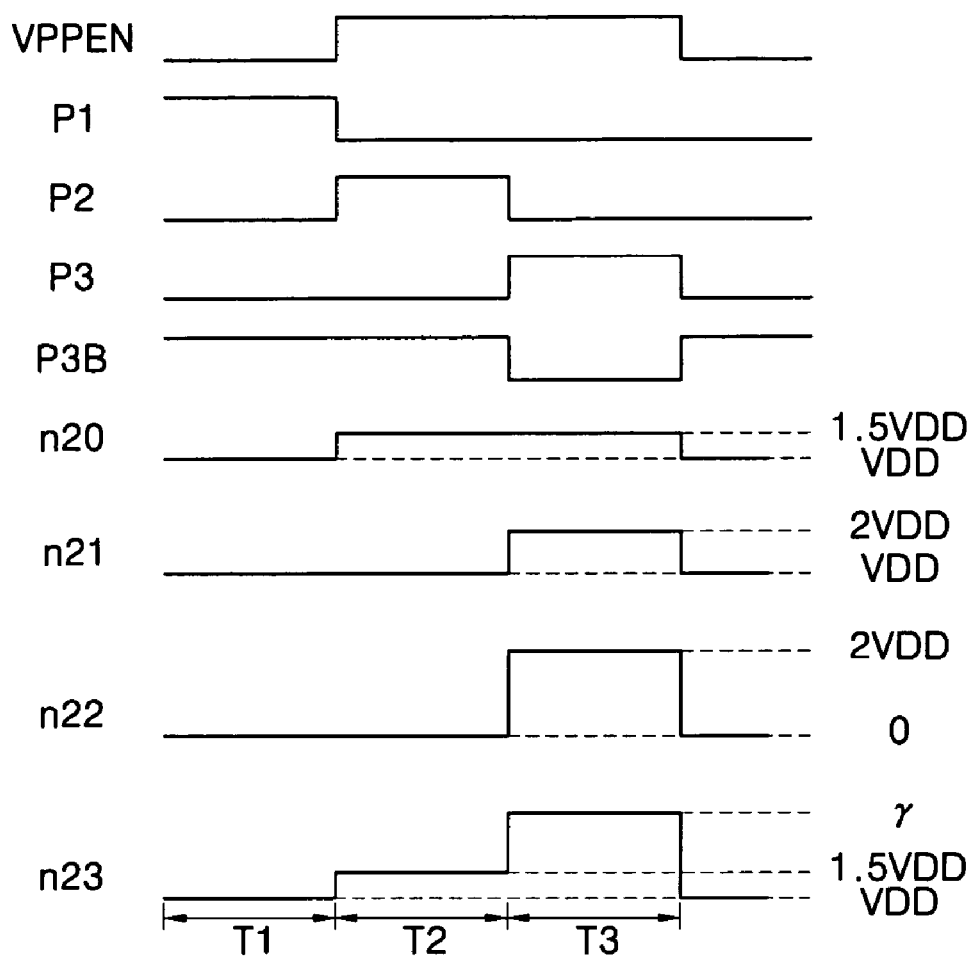
FIG. 8 is a timing diagram illustrating operations of the high voltage generating circuit shown in FIG. 7.

FIG. 8 is a timing diagram illustrating the operation of the high voltage generating circuit shown in FIG. 7. When the control signal generator 42 drives the precharge signal P1 to a high level during a precharge period T1, the switches SW30, SW31, and SW34 are turned on, so that the nodes n20, n21, and n23 are precharged to a power supply voltage VDD. When the control signal generator 42 drives the inverted pump signal P3B to a high level during the period T1, the switch SW33 is turned on, so that the node n22 is precharged to a ground voltage.

When the control signal generator 42 drives a pump signal P2 to a high level during a first pumping period T2, the capacitor C11 pumps the node n20 to a voltage 2 VDD, and the switch SW35 is turned on in response to the high level of the pump signal P2 so that charge is shared between the nodes n20 and n23. Thus, the nodes n20 and n23 reach a voltage 1.5 VDD. Because the control signal generator 42 continues to drive the inverted pump signal P3B to a high level, the switch SW33 is turned on so that the node n22 is maintained at the ground voltage. In some embodiments, the capacitance of the capacitor C11 is equal to the capacitance of the capacitor C13, i.e., if the capacitance of the capacitor C11 is C, the capacitance of the capacitor C13 may be C. The capacitance of the capacitor C12 may be equal to the capacitance of the capacitor C13 that is serially connected to the capacitor C12, e.g., the capacitance of the capacitor C12 may also be C.

When the control signal generator 42 drives the pump signal P3 to a high level during a second pumping period T3, the switches SW32 and SW36 are turned on and the switch SW33 is turned off, so that the node n21 is connected to the node 22 and the node n23 is connected to the high voltage generating terminal n24. The capacitor C12 pumps the nodes n21 and n22 to a voltage 2 VDD in response to the high level of the pump signal P3. Once the node n22 reaches the voltage 2 VDD, the capacitor C13 pumps the node n23 to a voltage 3.5 VDD. Because the switch SW36 remains turned on, charge is shared between the node n23 and the high voltage generating terminal n24, so that the node n23 and the high voltage generating terminal n24 reach a voltage. In this manner, the high voltage generating circuit 700 may generate a high voltage VPP to a maximum voltage 3.5 VDD.

The high voltage generating circuit 700 shown in FIG. 7 performs a two-stage pumping operation so that a maximum voltage 3.5 VDD may be obtained. Although the highest pumping voltage is lower than that of the high voltage generating circuit 500 shown in FIG. 5, the number of capacitors may be reduced in comparison to the high voltage generating circuit 500 shown in FIG. 5. Like the high voltage generating circuit shown in FIG. 5, even if the period of the high-voltage level detection signal VPPEN is shortened, the high voltage VPP may be maintained. Also, even if a power supply voltage is lowered, a highest pumping voltage may be elevated, thus a target high voltage VPP may be generated.

In the above-described exemplary embodiments, precharge nodes are precharged at the same time during the precharge period T1. However, directly after the first pumping period T2 comes to an end, each of the precharge nodes n10, n11, and n12 of FIG. 5 or the precharge node n20 of FIG. 7 may be precharged to a precharge voltage.

In the above-described exemplary embodiments, high voltage generating circuits and methods may be applied to semiconductor memory devices with low power supply voltage and high-speed operations. High voltage generating circuits and methods according to some embodiments of the present invention may stably generate a target high voltage even if a power supply voltage is lowered and the period of a high-voltage level detection signal is shortened. Consequently, high voltage generating circuits and methods according to embodiments of the present invention may be applied to a semiconductor memory device to increase reliability of the device.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. A high voltage generating circuit comprising:
   a high-voltage level detector for detecting a level of high voltage to generate a high-voltage level detection signal;
   a control signal generator for generating a precharge control signal and first and second pumping control signals in response to the high-voltage level detection signal; and
   a high voltage generator including a first pumper and a second pumper, the first pumper including first and second capacitors, pumping a first output node by serially connecting the first and second capacitors in response to the first pumping control signal, and allowing charges to be shared between the first output node and a second output node, the second pumper including third and fourth capacitors, pumping the second output node by serially connecting the third and fourth capacitors in response to the second pumping control signal, and allowing charges to be shared between the second output node and a high voltage generating terminal, the high voltage generator for connecting the first, second, third, and fourth capacitors between a first precharge voltage level and a second precharge voltage level in response to the precharge control signal.

2. The circuit according to claim 1, wherein the first pumper comprises:
a first precharge circuit for precharging a first node to the first precharge voltage level in response to the precharge control signal;
a second precharge circuit for precharging a second node to the second precharge voltage level in response to the precharge control signal;
a third precharge circuit for precharging the first output node to the first precharge voltage level in response to the precharge control signal;
a first switch for connecting the first and second nodes in response to the first pumping control signal; and
a second switch for allowing charges to be shared between the first and second output nodes in response to the first pumping control signal,
wherein the first capacitor is connected between the first pumping control signal and the first node, and the second capacitor is connected between the second node and the first output node.

3. The circuit according to claim 2, wherein the first precharge voltage level is a power supply voltage level, and the second precharge voltage level is a ground voltage level.

4. The circuit according to claim 1, wherein the second pumper comprises:
a fourth precharge circuit for precharging a third node to the first precharge voltage level in response to the precharge control signal;
a fifth precharge circuit for precharging a fourth node to the second precharge voltage level in response to a phase-inverted signal of the second pumping control signal;
a sixth precharge circuit for precharging the second output node to the first precharge voltage level in response to the precharge control signal;
a third switch for connecting the third to and the fourth node in response to the second pumping control signal; and
a fourth switch for allowing charges to be shared between the second output node and the high voltage generating terminal in response to the second pumping control signal,
wherein the third capacitor is connected between the second pumping control signal and the third node, and the fourth capacitor is connected between the fourth node and the second output node.

5. The circuit according to claim 4, wherein the first precharge voltage level is a power supply voltage level, and the second precharge voltage level is a ground voltage level.

6. The circuit according to claim 1, wherein the capacitances of the first and second capacitors are twice as much as the capacitances of the third and fourth capacitors.

7. A high voltage generating circuit comprising:
a high-voltage level detector for detecting a level of high voltage to generate a high-voltage level detection signal; and
a control signal generator for generating a precharge control signal and first and second pumping control signals in response to the high-voltage level detection signal; and a high voltage generator including a first pumper and a second pumper, the first pumper including a first capacitor, pumping a first output node in response to the first pumping control signal, and allowing charges to be shared between the first output node and a second output node, the second pumper including second and third capacitors, pumping the second output node by serially connecting the second and third capacitors in response to the second pumping control signal, and allowing charges to be shared between the second output node and a high voltage generating terminal, the high voltage generator for connecting the first, second, and third capacitors between a first precharge voltage level and a second precharge voltage level in response to the precharge control signal.

8. The circuit according to claim 7, wherein the first pumper comprises:
a first precharge circuit for precharging the first output node to the first precharge voltage level in response to the precharge control signal; and
a first switch for allowing charges to be shared between the first and second output nodes in response to the first pumping control signal,
wherein the first capacitor is connected between the first pumping control signal and the first output node.

9. The circuit according to claim 8, wherein the first precharge voltage level is a power supply voltage level, and the second precharge voltage level is a ground voltage level.

10. The circuit according to claim 7, wherein the second pumper comprises:
a second precharge circuit for precharging a first node to the first precharge voltage level in response to the precharge control signal;
a third precharge circuit for precharging a second node to the second precharge voltage level in response to a phase-inverted signal of the second pumping control signal;
a fourth precharge circuit for precharging the second output node to the first precharge voltage level in response to the precharge control signal;
a second switch for connecting the first and second nodes in response to the second pumping control signal; and
a third switch for allowing charges to be shared between the second output node and the high voltage generating terminal in response to the second pumping control signal,
wherein the second capacitor is connected between the second pumping control signal and the first node, and the third capacitor is connected between the second node and the second output node.

11. The circuit according to claim 10, wherein the first precharge voltage level is a power supply voltage level, and the second precharge voltage level is a ground voltage level.

12. The circuit according to claim 7, wherein the first, second, and third capacitors have the same capacitance.

13. A high voltage generating method comprising:
generating a high-voltage level detection signal by detecting a high voltage level;
generating a precharge control signal and first and second pumping control signals in response to the high-voltage level detection signal;
precharging a first node, a third node, a first output node, and a second output node to a first precharge voltage level and precharging a second node and a fourth node to a second precharge voltage level in response to the precharge control signal;

pumping the first node by a first capacitor in response to the first pumping control signal, connecting the first and second nodes, pumping the first output node by a second capacitor in response to a level of the second node, and sharing charges between the first and second output nodes; and pumping the third node by a third capacitor in response to the second pumping control signal, connecting the third node and the fourth node, pumping the second output node by a fourth capacitor in response to a level of the fourth node, and sharing charges between the second output node and a high voltage generating terminal.

14. The method according to claim 13, wherein the first precharge voltage level is a power supply voltage level, and the second precharge voltage level is a ground voltage level.

15. A high voltage generating method comprising:
detecting a high voltage level to generate a high-voltage level detection signal;
generating a precharge control signal and first and second pumping control signals in response to the high-voltage level detection signal;
precharging first and second output nodes and a first node to a first precharge voltage level and precharging a second node to a second precharge voltage level in response to the precharge control signal;
pumping the first output node by a first capacitor in response to the first pumping control signal and sharing charges between the first and second output nodes; and
pumping the first node by a second capacitor in response to the second pumping control signal, connecting the first and second nodes, pumping the second output node by a third capacitor in response to a level of the second node, and sharing charges between the second output node and a high voltage generating terminal.

16. The method according to claim 15, wherein the first precharge voltage level is a power supply voltage level, and the second precharge voltage level is a ground voltage level.

17. A semiconductor memory device comprising a high voltage generating circuit,
wherein the high voltage generating circuit comprises:
a high-voltage level detector for detecting a high voltage level to generate a high-voltage level detection signal;
a control signal generator for generating a precharge control signal and first and second pumping control signals in response to the high-voltage level detection signal; and
a high voltage generator including a first pumper and a second pumper, the first pumper including first and second capacitors, pumping a first output node by serially connecting the first and second capacitors in response to the first pumping control signal, and allowing charges to be shared between the first output node and a second output node, the second pumper including third and fourth capacitors, pumping the second output node by serially connecting the third and fourth capacitors in response to the second pumping control signal, and allowing charges to be shared between the second output node and a high voltage generating terminal, the high voltage generator for connecting the first, second, third, and fourth capacitors between a first precharge voltage level and a second precharge voltage level in response to the precharge control signal.

18. The device according to claim 17, wherein the first pumper comprises:
a first precharge circuit for precharging a first node to the first precharge voltage level in response to the precharge control signal;
a second precharge circuit for precharging a second node to the second precharge voltage level in response to the precharge control signal;
a third precharge circuit for precharging the first output node to the first precharge voltage level in response to the precharge control signal;
a first switch for connecting the first and second nodes in response to the first pumping control signal; and
a second switch for allowing charges to be shared between the first and second output nodes in response to the first pumping control signal,
wherein the first capacitor is connected between the first pumping control signal and the first node, and the second capacitor is connected between the second node and the first output node, and
wherein the first precharge voltage level is a power supply voltage level, and the second precharge voltage level is a ground voltage level.

19. The device according to claim 17, wherein the second pumper comprises:
a fourth precharge circuit for precharging a third node to the first precharge voltage level in response to the precharge control signal;
a fifth precharge circuit for precharging a fourth node to the second precharge voltage level in response to a phase-inverted signal of the second pumping control signal;
a sixth precharge circuit for precharging the second output node to the first precharge voltage level in response to the precharge control signal;
a third switch for connecting the third node and the fourth node in response to the second pumping control signal; and
a fourth switch for allowing charges to be shared between the second output node and the high voltage generating terminal in response to the second pumping control signal,
wherein the third capacitor is connected between the second pumping control signal and the third node, and the fourth capacitor is connected between the fourth node and the second output node, and
wherein the first precharge voltage level is a power supply voltage level, and the second precharge voltage level is a ground voltage level.

20. A semiconductor memory device comprising a high voltage generating circuit,
wherein the high voltage generating circuit comprises:
a high-voltage level detector for detecting a high voltage level to generate a high-voltage level detection signal;
a control signal generator for generating a precharge control signal and first and second pumping control signals in response to the high-voltage level detection signal; and
a high voltage generator including a first pumper and a second pumper, the first pumper including a first capacitor, pumping a first output node in response to the first pumping control signal, and allowing charges to be shared between the first output node and a second output node, the second pumper including second and third capacitors, pumping the second output node by serially connecting the second and third capacitors in response to the second pumping control signal, and allowing charges to be shared between the second output node and a high voltage generating terminal, the high voltage generator for connecting the first, second, and third capacitors between a first precharge voltage level and a second precharge voltage level in response to the precharge control signal.

21. The device according to claim 20, wherein the first pumper comprises:
a first precharge circuit for precharging the first output node to the first precharge voltage level in response to the precharge control signal; and
a first switch for allowing charges to be shared between the first and second output nodes in response to the first pumping control signal,
wherein the first capacitor is connected between the first pumping control signal and the first output node, and
wherein the first precharge voltage level is a power supply voltage level, and the second precharge voltage level is a ground voltage level.

22. The device according to claim 20, wherein the second pumper comprises:
a second precharge circuit for precharging a first node to the first precharge voltage level in response to the precharge control signal;
a third precharge circuit for precharging a second node to the second precharge voltage level in response to a phase-inverted signal of the second pumping control signal;
a fourth precharge circuit for precharging the second output node to the first precharge voltage level in response to the precharge control signal;
a second switch for connecting the first and second nodes in response to the second pumping control signal; and
a third switch for allowing charges to be shared between the second output node and the high voltage generating terminal in response to the second pumping control signal,
wherein the second capacitor is connected between the second pumping control signal and the first node, and the third capacitor is connected between the second node and the second output node, and
wherein the first precharge voltage level is a power supply voltage level, and the second precharge voltage level is a ground voltage level.

* * * * *